March 10, 1936.  W. F. ESTES  2,033,234
CAR ICING APPARATUS
Filed May 23, 1934  5 Sheets-Sheet 4
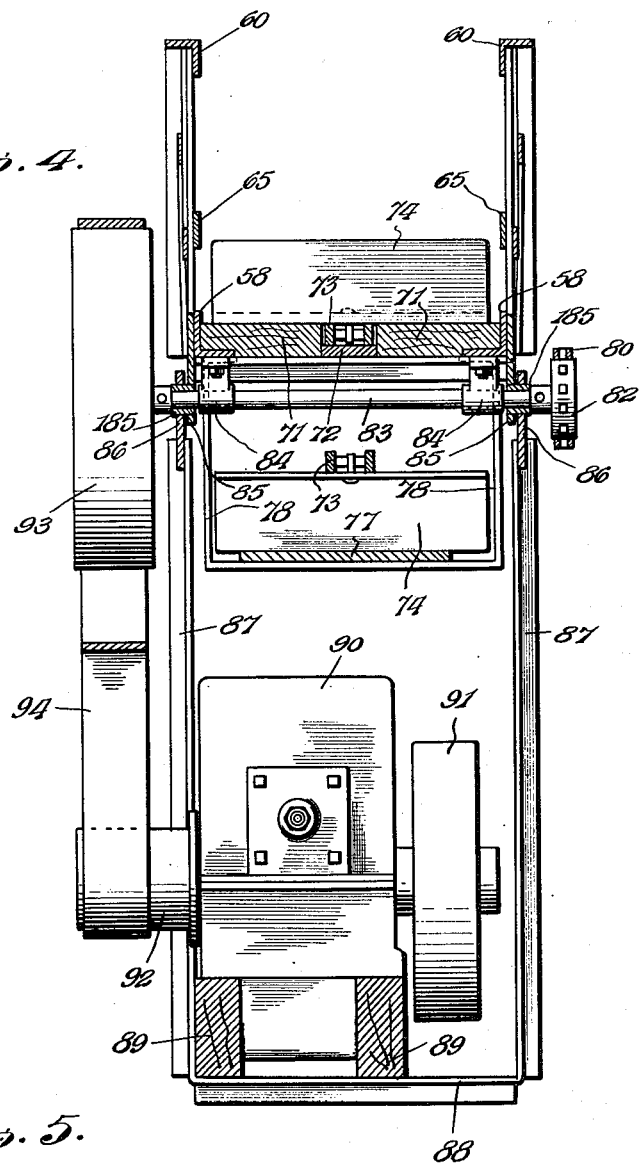
Fig. 4.
Fig. 5.
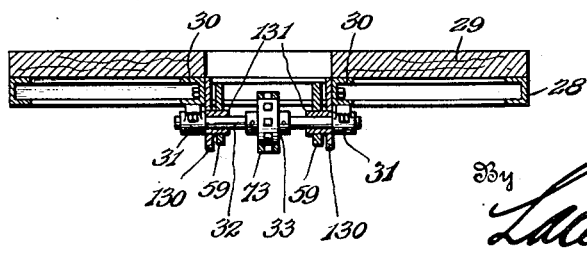
Inventor
W. F. Estes.
By Lacey & Lacey,
Attorneys March 10, 1936.   W. F. ESTES   2,033,234
CAR ICING APPARATUS
Filed May 23, 1934   5 Sheets-Sheet 5

Inventor
W. F. Estes.

By Lacey & Lacey, Attorneys

Patented Mar. 10, 1936

2,033,234

UNITED STATES PATENT OFFICE 2,033,234

CAR-ICING APPARATUS

William Fred Estes, Milan, Tenn., assignor to Beare Speedy Icing Company, Jackson, Tenn., a firm composed of Robert L. Beare, Jr., William F. Estes, and Joseph H. Wilson Application May 28, 1934, Serial No. 728,030

6 Claims. (Cl. 198—119)

This invention has for its primary object the provision of a portable truck upon which is mounted an elevator or conveyor so arranged that blocks of ice or other commodities may be readily shifted from a supply onto the elevator or conveyor and by the latter transferred to a place of deposit. The apparatus is intended more particularly for supplying ice to refrigerator railroad cars, but it may, of course, be advantageously utilized in other fields. The invention provides an apparatus which may be shifted into a desired position by manual manipulation and which may be also coupled to a truck and thereby drawn to more remote places, the truck carrying a supply of ice which is to be transferred to the conveyor and thence delivered into the compartment which is to be refrigerated. A particular object of the invention is to provide a motor for driving the elevator or conveyor so disposed and supported that the motor will remain in an even balanced horizontal position in all adjustments of the elevator and the platform may be easily shifted so as to bring the elevator into any desired angular relation to the car which is to be iced. The invention also seeks generally to provide an apparatus for the stated purpose which will be efficient in operation and which may be produced at a cost which is not prohibitive and which will be strong and durable. Other objects of the invention will appear incidentally in the course of the following description, and the invention resides in certain novel features which will be particularly defined in the appended claims.

In the annexed drawings which illustrate one embodiment of the invention, Figure 1 is a side elevation, with parts in section, of an apparatus constructed in accordance with the invention.

Figure 4 is a transverse section on the line 4—4 of Figure 1.

Figure 5 is a detail transverse section on the line 5—5 of Figure 2.

Figure 6:
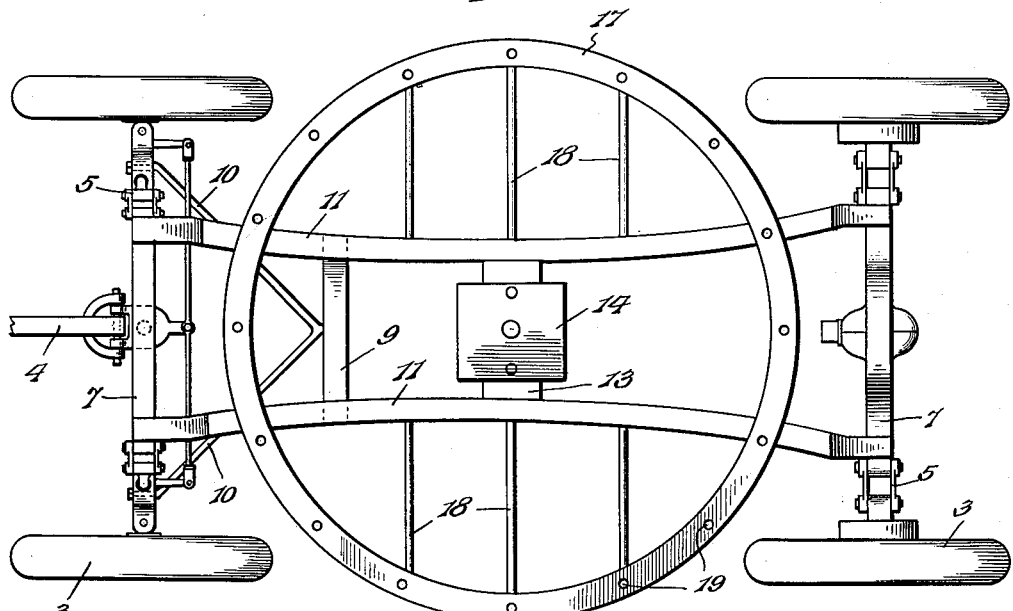
Figure 6 is a top plan view of the chassis or truck frame.
Figure 7:
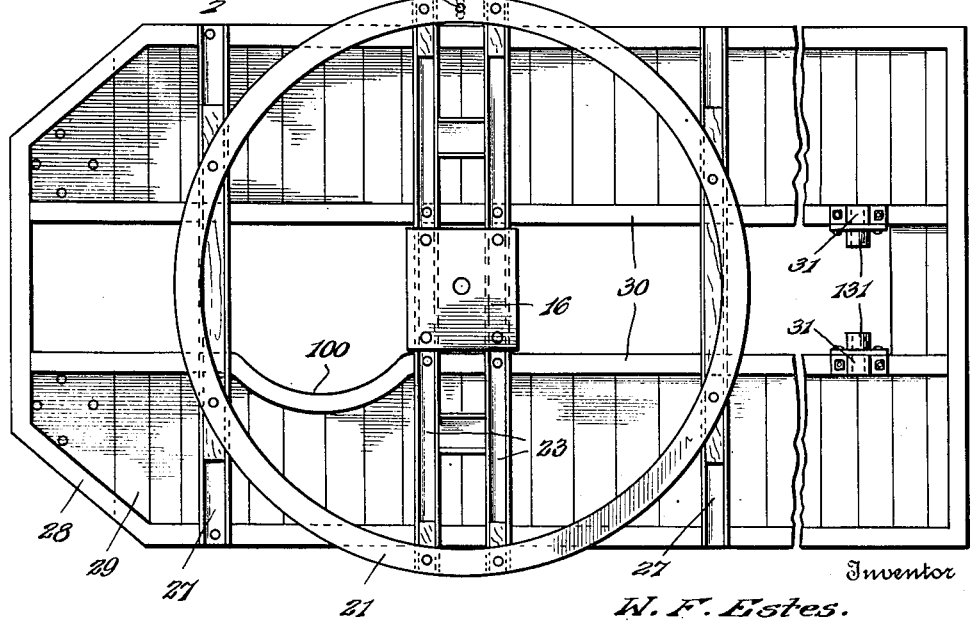
Figure 7 is a bottom plan view of the platform.

In carrying out the invention, there is provided a truck which includes front and rear axles indicated at 1 and 2 respectively, upon which are mounted ground wheels 3. The axles and wheels may be of any approved design, and in constructing a machine I have utilized automobile axles and wheels having pneumatic tires which have been found to be highly satisfactory. It is to be understood, that the size and number of the wheels may be varied to meet the conditions of use. To the front axle is attached a tongue or draw bar, indicated at 4, which may be manipulated by hand so as to maneuver the truck into a desired position or may be coupled to a motor vehicle carrying a load of ice so that the truck will be utilized as a trailer to be transported to a considerable distance. Supported upon the axles by shackles, indicated at 5, are sills 6 and cross bars or bolsters 7 which are formed from channel bars formed into the desired shape. The sills are preferably slightly curved inwardly from their ends, as clearly shown in Figure 6, and at their centers they are connected and reinforced by a brace 8 which is also preferably a channel bar. A cross bar 9 is also secured to and extends between the sills adjacent the front ends thereof and from this cross bar braces 10 extend to the front axle, as clearly shown. The front wheels are mounted upon the ends of the front axle so that they may be shifted into any desired angular position and thereby steer the truck over a prescribed path. Carried by the sills 6 are trusses consisting of upper longitudinal beams 11 formed of channel bars and having the same shape as the sills 6 and disposed directly over the sills, inclined braces 12 extending upwardly and inwardly from the extremities of the sills and being connected to the ends of the beams 11, preferably by welding, as will be understood. At the centers of the beams 11, a cross bar 13 is provided which extends between the beams and is firmly united therewith, while resting upon said cross bar 13 is secured a plate 14 which constitutes a bearing for a king bolt 15 and also a support for a similar plate 16, as will presently more fully appear. A lower annulus or fifth wheel member 17 is bolted or otherwise secured upon the beams 11 and is reinforced by brace rods 18 extending from the sills 6 to the side projecting portions of the annulus, as will be understood upon reference to Figure 6, and at intervals in this annular member 17 openings 19 are formed therethrough for a purpose which will presently be made known. Braces 20 may be secured to and extend between the sills 6 and the beams 11, as will be understood upon reference to Figure 1. The upper member of the fifth wheel is provided by an annulus or ring 21 which is disposed directly over and rests upon the annulus 17. At one point, the annulus or ring 21 is provided with a locking pin 22 which is mounted vertically therein and is adapted to engage in any one of the openings 19 so that the two rings or annuli will be held in a set position. Cross bars 23 are secured upon the upper side of the ring 21 near the center thereof and parallel with a diameter of the ring, as will be understood upon reference to Figure 7, these cross bars or braces being channel bars, as shown and as will be understood. The plate 16 is secured to the undersides of these braces and a similar plate 24 is secured upon the upper sides of the braces, the king bolt 15 passing through central openings in the plates 14, 16 and 24 and being equipped with a washer 25 and nut 26 above the plate 24 whereby the parts will be held in assembled relation and the upper ring or fifth wheel member may readily turn about the king bolt as a center, while resting on the lower ring or fifth wheel member. Other similar cross bars 27 are secured to and upon the ring 21 at the sides of the bars 23 and spaced therefrom and the several bars 23 and 27 are secured at their ends to a frame 28 formed of a channel bar and extending forwardly and rearwardly from the cross bars so as to define the area for a platform. The platform is completed by flooring or boards, indicated at 29, which is secured upon the frame 28, the flooring or boards, at the rear of the king bolt, being somewhat heavier or thicker than those in advance of the king bolt, as will be understood upon reference to Figure 1. Upon reference to Figures 2, 3 and 7, it will be noted that the platform has a central longitudinal opening which extends from the front extremity of the platform nearly to the rear extremity thereof. As best shown in Figure 7, the inner ends of the several boards, which constitute the flooring 29, may be secured to beams or rails 30 which will define the central longitudinal opening, the front end of the frame 28 bridging the front end of the opening, while the rear end of the opening may be covered by flooring, as shown in Figure 7. The construction thus far described provides a very strong truck which may be readily transported from place to place and will firmly support the conveyor or elevator, the motor for operating the same, and the means for adjusting the elevator to the desired inclination, while the platform and all parts mounted thereon may be readily turned to any desired position.

Figure 3:
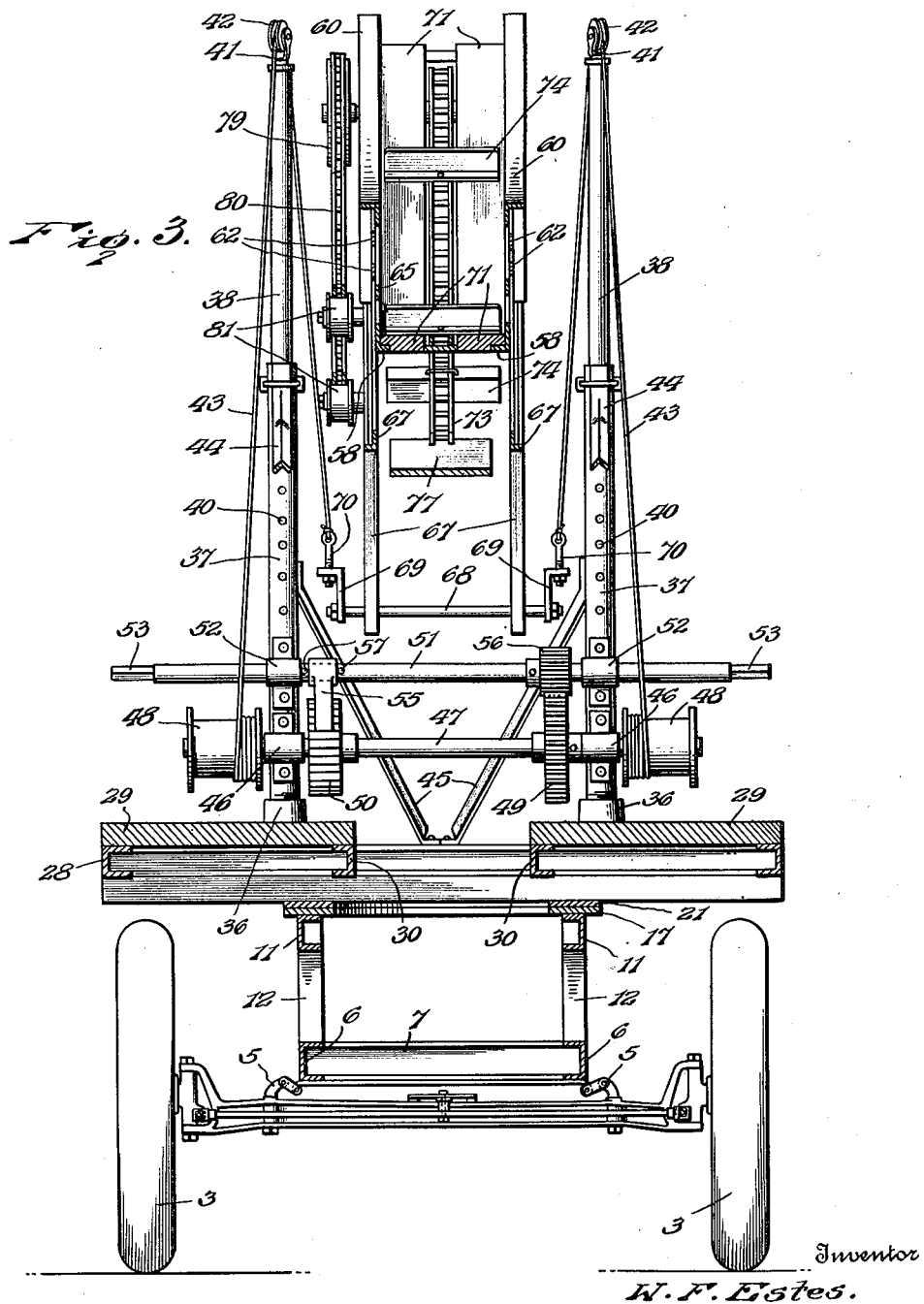
Figure 3 is a transverse section on the line 3—3 of Figure 1.

Secured to the undersides of the beams 30 are bearings 31 in which is journaled a shaft 32, a sprocket 33 being secured upon said shaft at the center of the same. This shaft 32 constitutes the pivotal center about which may be rocked the elevator or conveyor, which is designated as an entirety by the numeral 34. At the front end of the platform, metallic plates 35 are secured thereon at the opposite sides of the central slot or opening and upon these plates are secured sockets 36 in which are disposed the lower ends of telescopic posts 37 which constitute the main supports for the forward portion of the elevator. These posts 37 are preferably tubular and their lower sections or members receive upper sections 38 which will fit within the lower sections and may be held at any desired height by locking pins, indicated at 39, inserted through openings 40 in the post sections, as will be understood. In the upper ends of the upper sections 38 are mounted swivel sections 41 which carry guide pulleys 42 over which are trained cables 43. The lower sections 37 of the posts have the upper ends of inclined braces 44 secured to their upper ends in any approved manner, said braces extending to and having their lower rear ends firmly secured to the platform so that the posts will be braced against rearward strain. Downwardly converging braces 45 are secured to the posts at the inner sides of the same below the upper ends of the braces 44, and these braces 45 have their lower ends secured upon the front transverse end member of the frame 28, the posts being thereby strongly braced and held rigidly in the upright position desired for them. Near the lower ends of the post sections 37, bearings 46 are secured thereon and in these bearings is journaled a shaft 47, the ends of which project at the outer sides of the posts and carry windlasses or winding drums 48, as clearly shown in Figure 3. At the inner sides of the posts 37, the shaft 47 carries a gear 49 adjacent one post and adjacent the other post carries a ratchet wheel 50. An operating shaft 51 is journaled in bearings 52 secured upon the posts 37 above the bearings 46 and this shaft 51 is extended laterally beyond the posts and has its ends shaped, as indicated at 53, to be engaged by a crank handle or other turning tool, indicated at 54. A pawl or detent 55 is loosely hung upon the shaft 51 in position to engage the ratchet wheel 50 and thereby prevent retrograde rotation of the shaft 47, and a pinion 56 is secured upon the shaft 51 and meshes with the gear 49 so that when rotation is imparted to the shaft 51, the shaft 47 will be rotated and the drums 48 turned to wind or unwind the respective cables. The pawl 55 may be held against movement along the shaft 51 by any preferred means, as by pins 57 inserted into the shaft immediately adjacent the respective ends of the hub of the pawl, as shown in Figure 3. The cables 43 extend from the respective drums 48 over the pulleys 42 and then downwardly to be attached to the elevator or conveyor frame so that manipulation of the shafts in the stated manner will effect the raising or lowering of the forward delivery end of the elevator, as will be understood.

Figure 1:
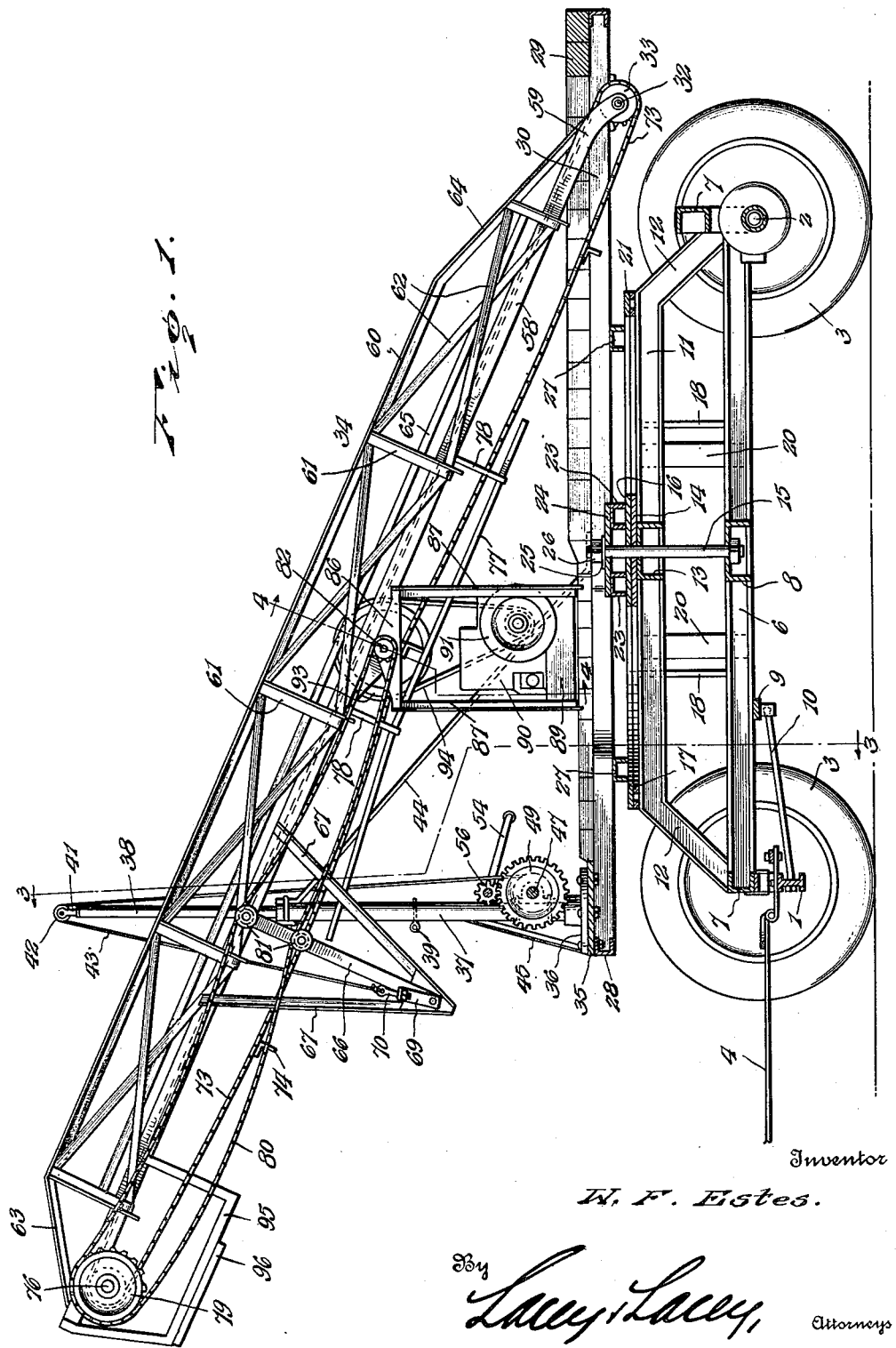
Figure 2:
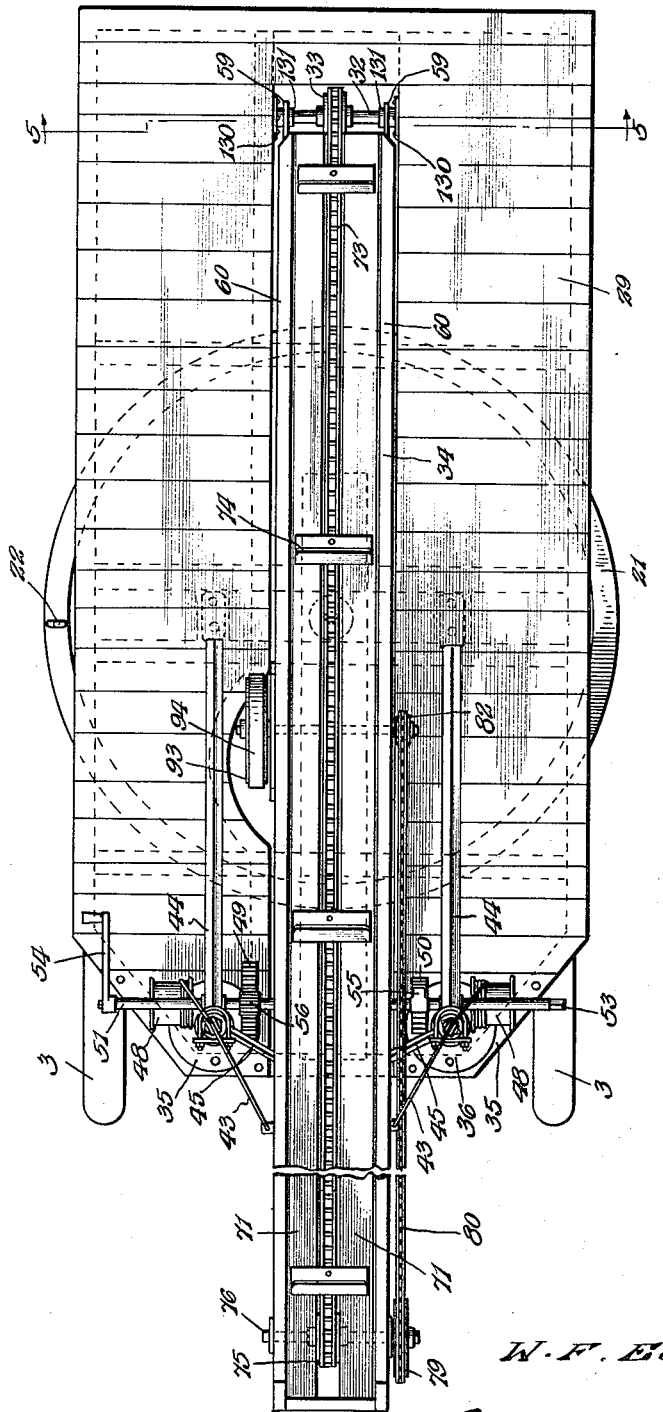
Figure 2 is a top plan view of the same.

The elevator or conveyor comprises side bars 58 of the proper length to the rear ends of which are secured bearing plates 59 having their free ends turned downwardly, as shown clearly in Figure 1, and journaled upon bearings concentric with the shaft 32 whereby they will pivotally support the elevator. Secured to and depending from the sills 30 are hanger plates 130 in which are welded short sleeves 131 which, when the parts are assembled, are alined axially with the bearings 31 so that they encircle the shaft 32 but are preferably out of contact therewith. The shaft thus forms the pivotal center for the conveyor but does not carry any of its weight, and, in all positions of the elevator, the drag chain trained about the sprocket 32 will be properly taut.

The side bars 58 of the elevator are angle bars, as shown most clearly in Figure 4, and disposed above these angle bars are truss frames which resist buckling of the side bars and consist of upper beams 60 connected with the side bars at intervals by posts 61 and crossed braces 62 whereby a rigid and strong truss is produced. The ends of the beams 60 and the side bars 58 are connected by inclined braces 63 and 64, and it will be noted that the rear or lower braces 64 are somewhat longer and less sharply inclined than the braces 63 so that the lower end of the elevator will not interfere with the shifting of blocks of ice from the platform onto the drag chain or traveling belt of the conveyor. Guard rails 65 are secured to the several straight braces or posts 61 at points above the bottom side bars 58 and these rails resist lateral deflection of the blocks of ice traveling over the bottom of the elevator. Adjacent the telescopic posts, between which the frame of the elevator passes, hanger bars 66 are secured to the side bars or rails 58 and depend therefrom, as shown clearly in Figure 1. Secured to the lower ends of these hangers and diverging upwardly therefrom are braces 67 which are secured at their upper ends to the sills or side bars 58, these braces and hangers constituting knees through the lower ends of which is mounted a cross rod 68 having brackets 69 secured to its ends. The brackets 69 are equipped with eyebolts 70 in which the ends of the cables 43 are secured, as clearly shown in Figures 1 and 3, and it will now be fully understood that the front end of the elevator is supported by the cables 43 and as the cables are wound or unwound the elevator will be caused to swing upwardly or downwardly on the bearing sleeves 131. The front or delivery end of the elevator may thus be easily adjusted so as to be disposed over the roof or through a door of a refrigerator car or in proper relation to any other place where ice is to be deposited.

The floor or trough of the elevator is defined by boards 71 secured to the side bars or rails 58 and separated along the central longitudinal line of the elevator, a central filler strip 72 being disposed between and secured to the inner edges of the floor members 71, as shown clearly in Figure 4, the central filler strip 72 being of less thickness than the side members 71 so that a channel is produced between the side members in which the drag chain 73 may travel, the lower run of the drag chain being disposed below the floor, as will be understood upon reference to Figure 1. As shown clearly in Figures 3 and 4, transverse cleats 74 are secured at intervals to the drag chain 73 and these cleats extend beyond the sides of the chain over the flooring members 71 so that blocks of ice, resting on said floor members and bridging the channel defined by the filler strip 72, will be engaged by the cleats and caused to ride on the floor or through the trough of the elevator and be discharged at the upper end thereof. The drag chain is trained about a sprocket 75 secured upon a shaft 76 which is journaled in bearings provided therefor and secured to the undersides of the side rails 58 adjacent the upper extremities of the latter, and the lower return run of the chain passes through a guarding trough defined by a plate 77 suspended from the side rails 58 by hangers 78 so that the drag chain and the cleats thereon will be prevented from becoming entangled with any of the other operating parts. It will be noted that the upper end of the plate 77 is bent somewhat away from the bed of the elevator and consequently the lower run of the drag chain and the cleats thereon will pass readily into this guard or protecting trough.

The shaft 76 is projected at one end beyond the side of the elevator and upon this projecting end is secured a sprocket gear 79 about which the drive chain 80 is trained, the runs of the drive chain being trained over and supported by idler pulleys 81 secured on the outer side of one of the hangers 66. The drive chain 80 derives motion from a sprocket pinion 82 secured upon one end of a shaft 83 which is journaled in bearings 84 secured upon the undersides of the respective rails 58, as shown most clearly in Figure 4. Secured to the outer sides of the rails 58 and fitting about the shaft 83 adjacent the bearings 84 are hanger plates 85 and at the outer sides of these plates 85 suspension plates 86 are pivotally mounted. The plates 86 are welded or otherwise united at their ends with the upper ends of angle bars 87 which constitute the corner pieces of a cage which carries the motor for driving the elevator, and the pivotal connections between the hangers and the suspension plates are midway the ends of the suspension plates. Short bearing sleeves 185 are welded to the hangers 85 and project at the outer sides thereof to constitute bearings upon which the plates 86 are engaged. When the parts are assembled, the bearing sleeves 185 are alined axially with the bearings 84 so that, while the cage may turn about the shaft, none of the weight of the cage is imposed on the shaft. The posts 87 are preferably made integral with cross members 88, as clearly shown in Figure 4. Upon these cross members 88 are secured blocks or other bases 89 upon which a motor 90 rests and this motor may be an electric motor having a storage battery connected therewith or may be an internal combustion engine, the motor being, therefore, illustrated in a conventional manner. The motor shaft is equipped at one end with a flywheel 91 and at its opposite end with a drive pulley 92 about which and a pulley 93 on the end of the shaft 83 is trained a driving belt 94. It will now be seen that the drag chain 73 is driven from the motor 90 and it is to be noted that the motor-supporting frame will always hang perpendicularly from the elevator frame in whatever inclination the frame may be set, the motor, therefore, always being horizontal. The elevator will be driven easily at all times and in a very economical manner. The motor may be started before the elevator is adjusted into the desired inclination and will need no attention from the workman.

At the upper ends of the side rails 58, I secure a sprocket guard consisting of frames 95 depending from the side rails 58 of the elevator and connected by a cross plate 96 so that, when the elevator is adjusted so that its upper end will be supported on the roof of a car which is to be supplied with ice, the weight of the elevator frame will be carried by the guard frames 95 and the chains 73 and 80 and sprockets 75 and 79 will not come in contact with the roof of the car and, consequently, will not be mutilated or retarded in their operation.

From the foregoing description, taken in connection with the accompanying drawings, it will be seen that I have provided a very compact and easily manipulated apparatus for elevating ice or other commodities or delivering the same into a refrigerator car or other place of deposit. The device may be coupled to a truck so as to be carried to a predetermined destination and then manipulated by hand into the proper position for delivering the ice at the desired point. The supporting frame or truck of the apparatus need not be brought into any particular position relative to the refrigerator car or other ice receptacle inasmuch as the fifth wheel and platform may be rotated so as to present the elevator at any angle to the receptacle and the elevator can then be readily brought into the proper inclination to set its upper delivery end in proper relation to the receptacle or point of deposit. The inclination of the elevator is adjusted by the manipulation of the winding drums, and when the delivery end of the elevator is to be lowered, it is necessary merely to release the pawl 55 from the ratchet 50 whereupon the weight of the elevator will lower it to the platform, and it may be noted that the central opening of the platform is provided at one side with a recess to accommodate projecting portions of the motor cage. When the delivery end of the elevator is lowered to its extreme low position, the engine and lower portion of the cage may sink below the platform through the longitudinal opening therein and will operate efficiently in that position, the pulley 92 being accommodated in the recess 100 provided in one side of the central longitudinal slot in the platform. It is to be particularly noted that the motor-carrying cage is suspended from the elevator frame like a pendulum so that it will always be in a perpendicular position and the motor will, consequently, operate properly without attention until it is lowered to the platform whereupon it may be easily stopped after the entire quantity of ice has been delivered. When it is desired, lights may be, of course, arranged upon the elevator at such points and in such manner as may be deemed most advantageous in order to illuminate the apparatus when it becomes necessary to operate the same at night.

Having thus described the invention, I claim:

1. Apparatus for the purpose set forth comprising a portable truck, a platform mounted upon the truck for turning movement in a plane parallel with the top of the truck, an elevator including a frame mounted at its receiving end upon the truck, means suspended on the elevator frame between the ends thereof for operating the elevator, and means carried by the truck for raising and lowering the delivery end of the elevator.

2. Apparatus for the purpose set forth comprising a portable truck, an elevator mounted thereon and including an endless drag chain, means for raising and lowering the elevator, and a motor freely pivotally suspended on the elevator between the ends thereof and connected with the drag chain for driving the same.

3. Apparatus for the purpose set forth comprising a portable platform, an elevator pivotally supported at one end upon one end of the platform, means at the opposite end of the platform for raising and lowering the adjacent end of the elevator, a frame pivotally attached to the elevator between the ends thereof and depending freely therefrom, and a motor carried by said frame and operatively connected with the elevator.

4. Apparatus for the purpose set forth comprising a portable platform having a central longitudinal opening, a shaft journaled upon the underside of the platform at one end of said opening, an elevator frame disposed above the platform, bearing plates secured to the sides of the elevator frame at the lower end of the same and having their ends bent downwardly to be pivotally mounted below the platform in alinement with the shaft, means on the platform for supporting and raising and lowering the opposite end of the elevator, a sprocket secured upon said shaft, a drag chain trained about said sprocket, and means for actuating said chain.

5. Apparatus for the purpose set forth comprising a portable platform an elevator frame hingedly connected at one end with the platform, means on the platform for supporting the opposite end of the elevator frame and raising and lowering the same, bearings secured upon the underside of the elevator frame, a shaft journaled in said bearings, a drag chain extending through the elevator frame, means whereby said chain will be actuated from said shaft, bearing plates pivotally mounted midway their ends in alinement with said shaft, a frame secured to and depending from the ends of said plates, a motor carried by said frame, and means driven by said motor for rotating said shaft.

6. Apparatus for the purpose set forth comprising a truck, an elevator mounted thereon and including an endless drag chain, means on the truck for shifting the elevator, a motor pivotally suspended freely between the ends of the elevator and connected with the drag chain for driving the same, and means carried at the free end of the elevator for protecting the drag chain and elevator in use.

WILLIAM FRED ESTES